US012737395B2

(12) United States Patent
O'Hara

(10) Patent No.: US 12,737,395 B2
(45) Date of Patent: Sep. 15, 2026

(54) GENERATION OF FORMULA FROM NATURAL LANGUAGE DESCRIPTION

(71) Applicant: SAP IRELAND LIMITED, Dublin (IE)

(72) Inventor: Paul O'Hara, Dublin (IE)

(73) Assignee: SAP IRELAND LIMITED, Dublin (IE)

( * ) Notice: Subject to any disclaimer, the term of this patent is extended or adjusted under 35 U.S.C. 154(b) by 192 days.

(21) Appl. No.: 18/669,860

(22) Filed: May 21, 2024

(65) Prior Publication Data

US 2025/0363138 A1 Nov. 27, 2025

(51) Int. Cl.
*G10L 15/26* (2006.01)
*G06F 16/3329* (2025.01)
*G06F 16/334* (2025.01)
*G06F 16/383* (2019.01)

(52) U.S. Cl.
CPC ...... *G06F 16/3329* (2019.01); *G06F 16/3347* (2019.01); *G06F 16/383* (2019.01)

(58) Field of Classification Search
None
See application file for complete search history.

(56) References Cited

U.S. PATENT DOCUMENTS 12,032,918 B1 * 7/2024 Garvey .................. G06F 40/40
2021/0118431 A1 * 4/2021 Zhang ..................... G06N 3/08
2021/0142164 A1 * 5/2021 Liu ........................ G06F 40/40
2022/0318507 A1 * 10/2022 Barkan .................... G06N 3/09
2024/0411896 A1 * 12/2024 Myers ................... G06F 21/552
2025/0013963 A1 * 1/2025 Qazvinian .......... G06Q 10/0639
2025/0217174 A1 * 7/2025 Shoshan ................. G06F 9/453
2025/0252121 A1 * 8/2025 Sulser ................ G06F 16/3329
2025/0298583 A1 * 9/2025 Carrara ..................... G06F 8/31
2025/0307236 A1 * 10/2025 Tang ................ G06F 16/24534
2025/0321718 A1 * 10/2025 Toub ........................ G06N 3/08
2025/0335434 A1 * 10/2025 Chen .................. G06F 16/2255
2025/0342191 A1 * 11/2025 Noel ..................... G06F 16/353
2025/0348360 A1 * 11/2025 Abadi .................. G06F 9/5027

* cited by examiner

*Primary Examiner* — Neeraj Sharma

(74) *Attorney, Agent, or Firm* — Buckley, Maschoff & Talwalkar LLC

(57) ABSTRACT

Systems and methods include reception of a natural language description of a calculation formula and metadata of a data source, generation of a first prompt to prompt determination of calculation components of the calculation formula based on the description, reception of a plurality of calculation components from a text generation model in response to the first prompt, determination, for each of the plurality of calculation components, of metadata of each of one or more similar operators to a calculation component, generation of a second prompt to determine the calculation formula based on the natural language description, the metadata of the data source and the metadata of each of the one or more similar operators, and reception of the calculation formula from the text generation model in response to the second prompt.

14 Claims, 10 Drawing Sheets

GENERATION OF FORMULA FROM NATURAL LANGUAGE DESCRIPTION

BACKGROUND

Generative AI-assisted workflows are increasingly used across a range of industries. Adoption has been particularly prevalent in Information Technology (IT)-related fields. For example, generative AI has been leveraged to enhance technical support, cyberthreat analysis, cybersecurity training, data analysis, and software development.

Data analysis tools are capable of executing complex algorithms for the processing of data. Unfortunately, configuring a data analysis tool to execute such algorithms is beyond the skill set of an average user. Even if a user has a general idea of the required steps, creating an executable implementation of those steps often requires programming language expertise and extensive knowledge of available functionality. Such available functionality is usually poorly documented, leading to decreased productivity and increased risk of logical errors or sub-optimal implementations.

What is needed is a system to efficiently generate data processing instructions, using available operators, from a natural language description thereof.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments provide a framework enabling the generation of a calculation formula from a natural language description. The calculation formula may include one or more available operators and embodiments are not limited to any particular set of available operators. Moreover, embodiments do not require user familiarity with the available operators, their syntax or how to compose two or more of the operators.

Embodiments may utilize one or more Large Language Models (LLMs) and a pre-prepared vector store. Briefly, a user creates a natural language description of a calculation formula. The natural language description is input to an LLM along with metadata of a data source against which the calculation formula is to be executed. The LLM decomposes the natural language description into calculation components which contribute to the calculation formula. Each calculation component is converted into an embedding, for example using an embedding model.

The vector store stores embeddings in association with metadata of available calculation operators. For each embedding that was converted from a calculation component, the vector store is searched for a set of similar embeddings. The metadata associated with the similar embeddings in the vector store is returned, resulting in metadata of one or more candidate calculation operators for each calculation component.

The metadata of the candidate operators, the natural language description and the data source metadata are input to an LLM with a prompt tasking the LLM to generate the calculation formula. The LLM generates and outputs the calculation formula and information detailing the operators selected for use within the calculation formula. Some embodiments subsequently apply syntactic and logical validations to the generated calculation formula prior to returning the calculation formula to the user. The user may then execute the calculation formula against the data source, as-is or after desired modification.

Figure 1:
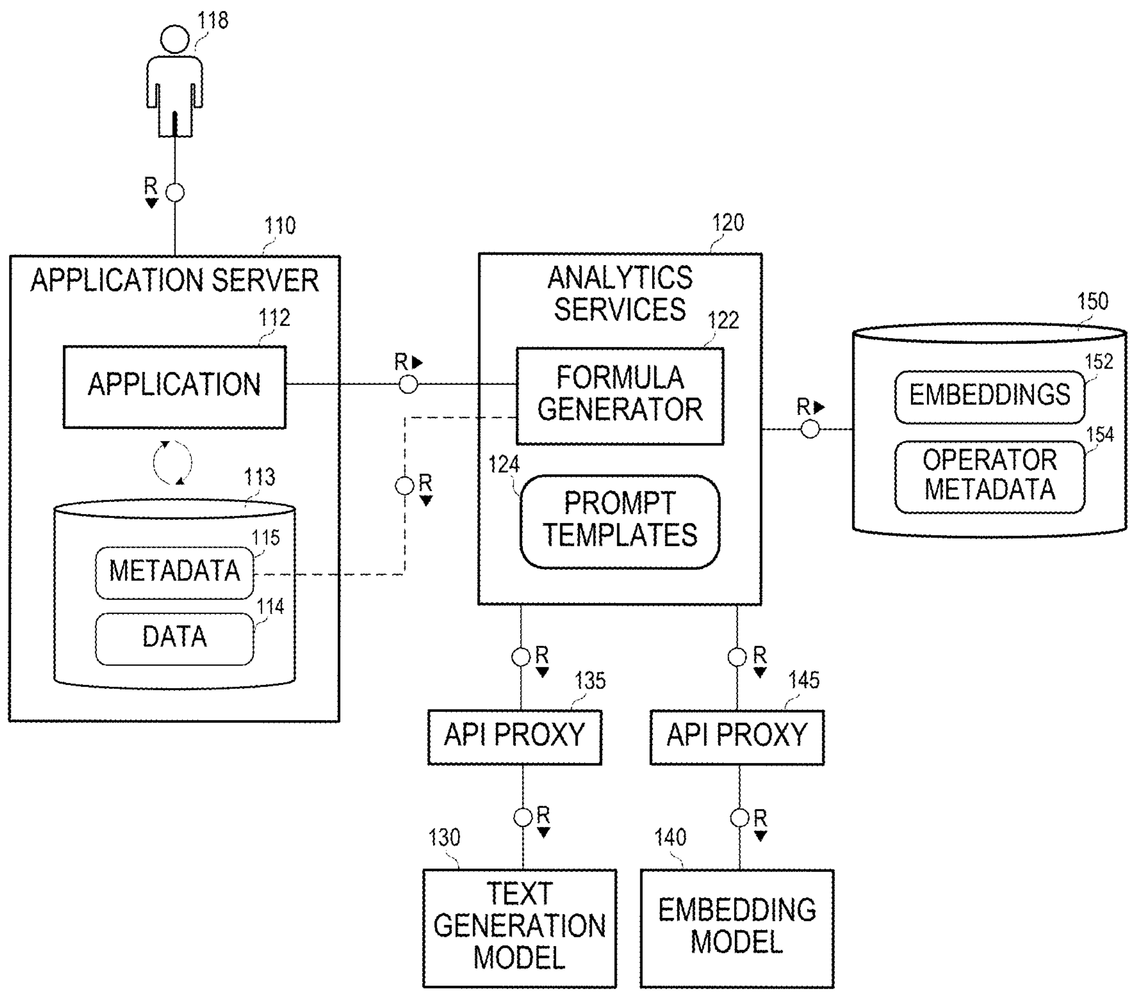
FIG. 1 is a block diagram of an architecture to generate a calculation formula from a natural language description according to some embodiments.

FIG. 1 is a block diagram of an architecture to generate a calculation formula from a natural language description according to some embodiments. Each of the illustrated components may be implemented using any suitable combination of on-premise, cloud-based, distributed (e.g., including distributed storage and/or compute nodes) computing hardware and/or software that is or becomes known. Each computing system described herein may comprise one or more physical and/or virtualized servers.

Two or more components of FIG. 1 may be co-located. In some embodiments, two or more components are implemented by a single computing device. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Application server 110 may comprise one or more servers, virtual machines, clusters of a container orchestration system, etc. Application server 110 may provide an operating system, services, I/O, storage, libraries, frameworks, etc. to applications executing therein.

Application 112 may comprise program code executable by a processing unit to provide functions to users such as user 118 based on coded logic and on data 114 stored in data store 113. Data 114 may comprise tabular data stored in a columnar or row-based format, object data or any other type of data that is or becomes known. Metadata 115 describes the structure and relationships of data 114 as is known in the art, including but not limited to table schemas. Data store 113 may comprise any suitable storage system such as database system, which may be partially or fully remote from application server 110, and may be distributed as is known in the art.

According to some embodiments, user 118 may interact with application 112 (e.g., via a Web browser executing a front-end UI application associated with application 112) to issue a request associated with data 114. A request may request a filtered table of data of data 114, a calculation using data of data 114, a particular visualization of data of data 114, and/or and other information that is or becomes known. To serve a received request, application 112 may generate queries of data 114 based on metadata 115 to retrieve required data. Application 112 and/or data store 113 may perform processing on data 114 prior to returning the data to user 118.

Application 112 may call analytics services 120 in response to requests received from user 118. For example, user 118 may input a natural language description of a calculation formula into an interface provided by application 112 and request determination of a calculation formula based on the description. Application 112 may transmit the natural language description and metadata of a data source against which the formula is to be executed to analytics services 120.

Analytics services 120 may be implemented by one or more on-premise or cloud-based servers. Analytics services 120 includes program code of formula generator 122, which may be executed to generate calculation formulas as described herein. The metadata may be provided by application 112 as mentioned above or requested and received directly from data store 113 by formula generator 122, as indicated by the dashed line of FIG. 1.

Formula generator 122 creates a prompt consisting of a system prompt and a user prompt based on a system prompt template of prompt templates 124 and a user prompt template of prompt templates 124. The prompt includes the description, the metadata and instructions to decompose the natural language description into calculation components which contribute to the calculation formula. The prompt is provided to Application Programming Interface (API) proxy 135 of trained text generation model 130.

Text generation model 130 may comprise a neural network trained to generate text based on input text. Trained text generation model 130 may be implemented by, for example, executable program code, a set of hyperparameters defining a model structure and a set of corresponding weights, or any other representation of an input-to-output mapping which was learned as a result of the training.

According to some embodiments, model 130 is a large language model (LLM) conforming to a transformer architecture. A transformer architecture may include, for example, embedding layers, feedforward layers, recurrent layers, and attention layers. Generally, each layer includes nodes which receive input, change internal state according to that input, and produce output depending on the input and internal state. The output of certain nodes is connected to the input of other nodes to form a directed and weighted graph. The weights as well as the functions that compute the internal states are iteratively modified during training.

An embedding layer creates embeddings from input text, intended to capture the semantic and syntactic meaning of the input text. A feedforward layer is composed of multiple fully-connected layers that transform the embeddings. Some feedforward layers are designed to generate representations of the intent of the text input. A recurrent layer interprets the tokens (e.g., words) of the input text in sequence to capture the relationships between the tokens. Attention layers may employ self-attention mechanisms which are capable of considering different parts of input text and/or the entire context of the input text to generate output text.

Non-exhaustive examples of trained text generation model 130 include GPT-4, LaMDA, Claude or the like. Model 130 may be publicly available or deployed within a landscape which is trusted by a provider of analytics services 120. Similarly, text generation model 130 may be trained based on public and/or private data.

Text generation model 130 generates a response based on the received prompt. The response may include metadata (e.g., name, description, syntax, etc.) describing calculation components which contribute to the calculation formula described by the natural language description. Formula generation 122 transmits the metadata of each calculation component to embedding model 140 via API proxy 145 and receives an embedding (i.e., a multi-dimensional numerical vector representing the metadata) for each calculation component in return.

Formula generator 122 queries vector store 150 for each received embedding. Vector store 150 may comprise a vector database in some embodiments. Vector store 150 stores embeddings 152 representing respective instances of operator metadata 154. Each instance of operator metadata 154 is associated with a calculation operator suitable for use by application 112. In response to each query, vector store 150 returns one or more instances of operator metadata 154. These one or more instances of operator metadata returned for each embedding represent candidate calculation operators.

Using prompt templates 124, formula generator 122 generates another prompt including the metadata of the candidate calculation operators, the natural language description, the metadata of the data source, and instructions to generate a calculation formula. The prompt is transmitted to text generation model 130, which generates and returns the calculation formula to formula generator 122 in response. Model 130 may also generate and return information indicating the operators selected for use within the calculation formula.

The calculation formula is returned to application 112 and may be presented to user 118. According to some embodiments, formula generator 122 applies syntactic and logical validations to the calculation formula prior to returning the calculation formula to application 112. User 118 may use the calculation formula within application 112, for example to generate a particular data visualization.

Figure 2A:
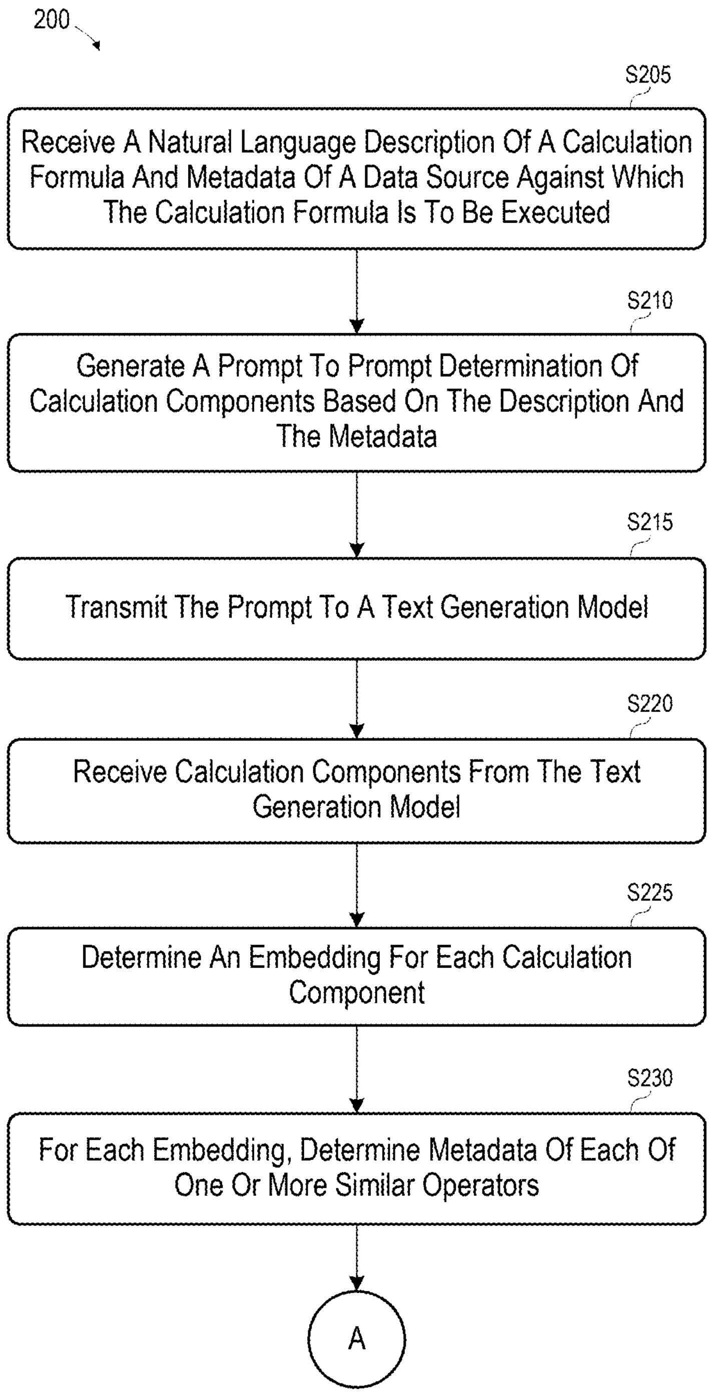
FIGS. 2A and 2B comprise a flow diagram of a process to generate a calculation formula from a natural language description according to some embodiments.
Figure 2B:
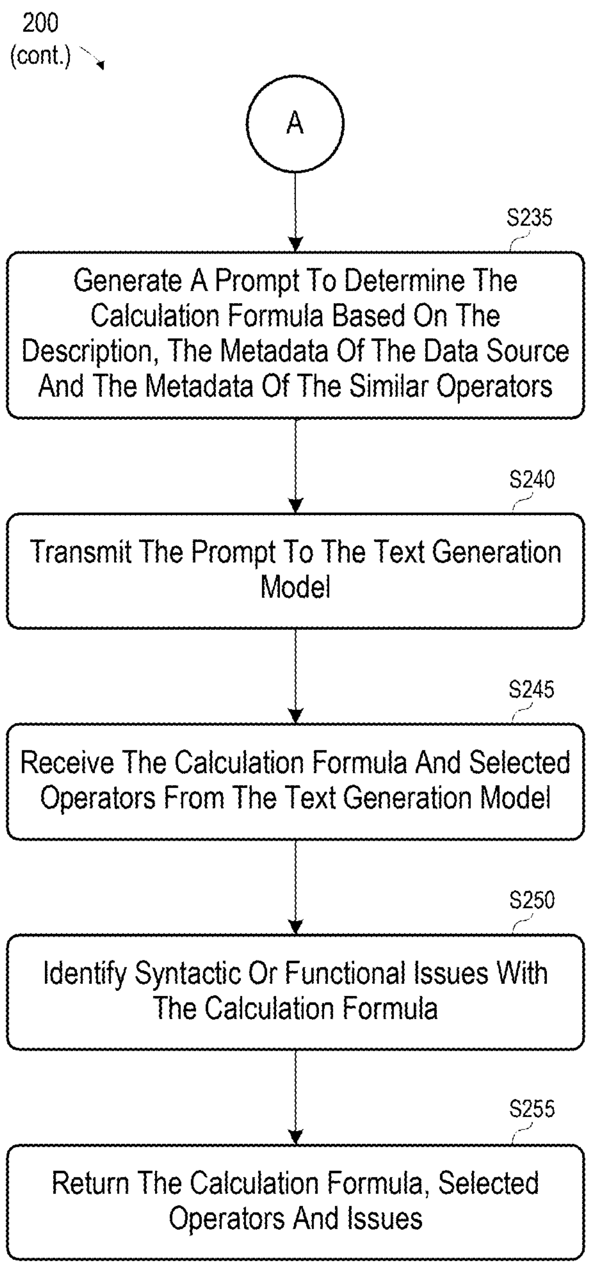

FIGS. 2A and 2B comprise a flow diagram of process 200 to generate a calculation formula from a natural language description according to some embodiments. Process 200 and the other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any one or more processing units, including but not limited to a processor, a processor core, and a processor thread. Embodiments are not limited to the examples described below.

A natural language description of a calculation formula and metadata of a data source are received at S205. As mentioned above, the calculation formula is intended to be executed against the data source. The natural language description may be created by a user in any suitable manner. A user may, for example, input the natural language description and the data source via a data analytics application and instruct the data analytics application to generate a calculation formula based thereon.

The metadata received at S205 may be provided by the above-mentioned data analytics application. The metadata may conform to any format, including but not limited to JavaScript Object Notation.

Figure 3:
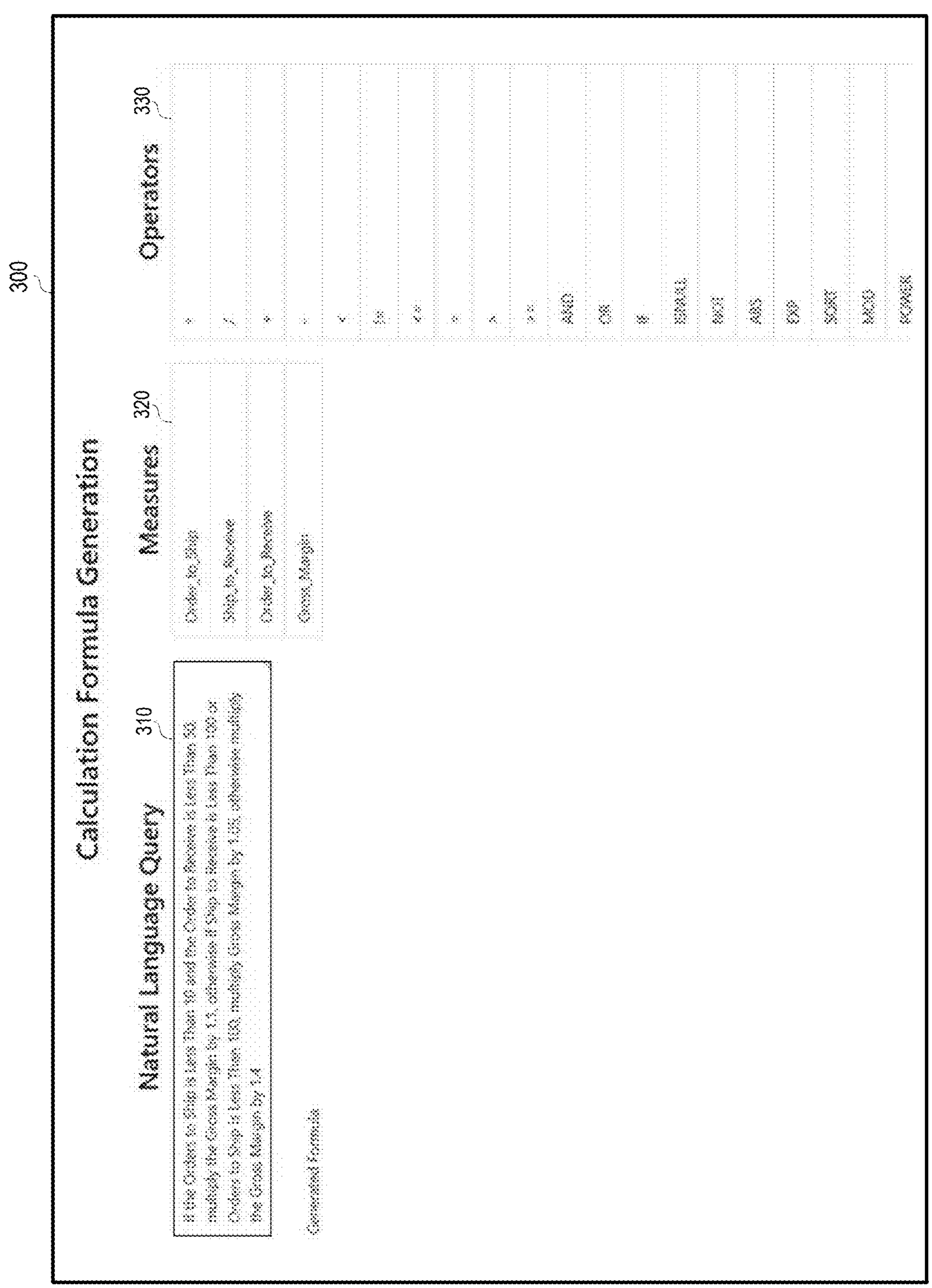
FIG. 3 is a user interface for creating a natural language description of a calculation formula according to some embodiments.

FIG. 3 illustrates user interface 300 of a data analytics application according to some embodiments. In one example, user 118 executes a Web browser to access application 112 via HyperText Transfer Protocol and to receive user interface 300 in return. User interface 300 includes area 310 for inputting a natural language description of a calculation formula. Measures 320 are metadata of a previously-selected data source against which the calculation formula is to be executed. In the illustrated example, the metadata are column names of a database table. User interface 300 also presents calculation operators which may be available for use in the calculation formula which is to be generated.

After receiving the description and metadata, a prompt is generated at S210. The prompt is intended to prompt determination of calculation components from the description based on the description and the metadata. According to some embodiments, S210 includes selection of a system prompt template and a user prompt template and populating the user prompt template with the description and the metadata.

The system prompt template may, in some embodiments, include instructions to identify columns referenced in the metadata and in the natural language calculation formula description, to understand the intent of the natural language calculation formula description, and to determine all necessary 'excel like' calculation components required to transform the description into a calculation formula, where each component performs only a single operation. An example system prompt which may be selected at S210 according to some embodiments is set forth in Appendix A.

The system prompt of Appendix A describes a task of decomposing a provided natural language description into possible calculation formula components needed to produce the complete calculation formula. The task is divided into subtasks which are also described therein. Appendix B shows a corresponding user prompt, in which the fields {0} and {1} of the user prompt are to be populated with, respectively, the natural language description and the metadata received at S205. The prompt generated at S210 consists of the system prompt and the populated user prompt. The prompt is transmitted to a text generation model at S215. It is assumed that the text generation model operates on the prompt as trained and, in response, calculation components are received therefrom at S220.

An embedding is determined for each calculation component at S225. An embedding may be determined for a calculation component by transmitting the calculation component to an embedding model and receiving an embedding in return. Next, at S230, each embedding is used to determine metadata for each of one or more similar operators. The operators may be usable by the data analytics application from which the natural language description was received.

According to some embodiments, a vector store is queried for operator metadata based on the determined embeddings. The vector store may store embeddings representing respective instances of operator metadata. For each embedding determined at S225, the vector store may determine embeddings which are most similar to the embedding and return operator metadata which is stored in association with the most-similar embeddings.

Figure 4:
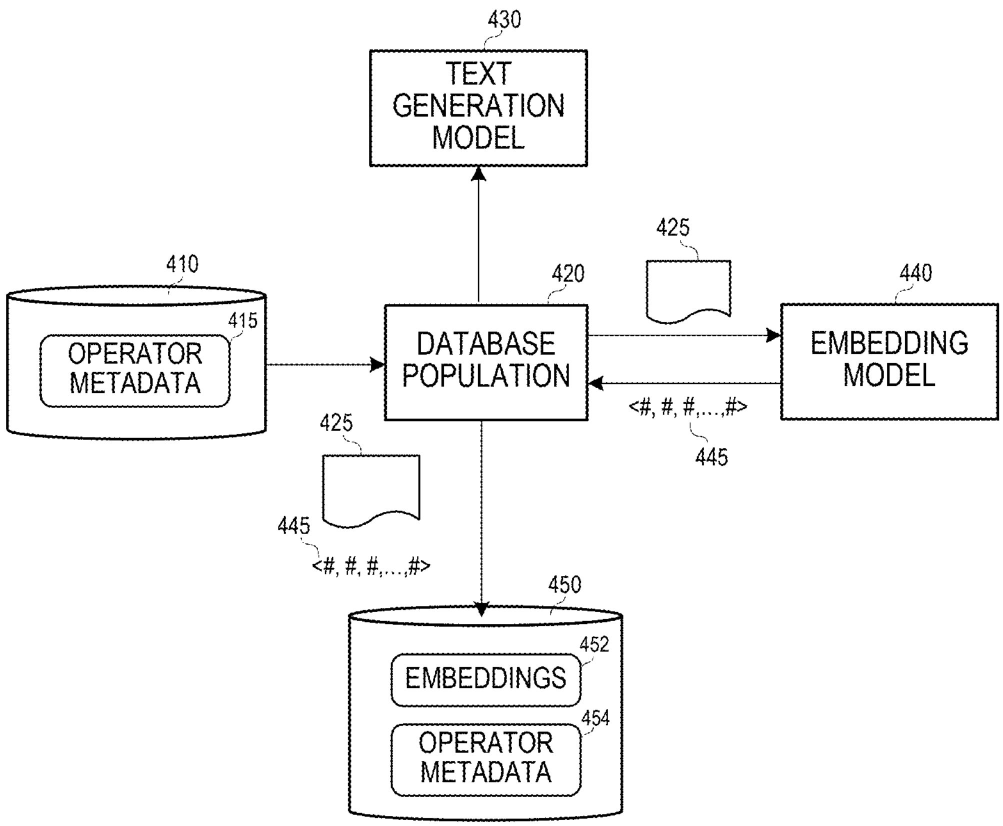
FIG. 4 illustrates generation of a vector database according to some embodiments.

FIG. 4 illustrates generation of a vector database according to some embodiments. Data store 410 includes metadata 415 describing operators which may be used in calculation formulas of a given analytics application/system. Metadata 415 may comprise the contents of a properties file storing help text for all calculation operators available within a given application. Such a properties file may be typically utilized to provide users with in-application descriptions of each operator.

Metadata 415 is accessed by database population component 420. Component 420 may generate metadata 425 based on metadata 415. Metadata 425 may comprise any subset of metadata 415 and may conform to any format. In some embodiments, metadata 425 includes a predefined structured object (e.g., a JSON object) for each operator, containing a name, a short description, parameter descriptions (including mandatory and optional flags), abstract syntax (including parameters), alternative names, and example applications of the syntax within calculation formulas using only the operator.

According to some embodiments, component 420 uses text generation model 430 to convert metadata 415 to operator-specific metadata objects. Component 420 may create a prompt instructing text generation model to create a JSON object as described above based on input text. The prompt may include a system prompt and a user prompt.

Appendix C includes a system prompt which may be used by component 420 to convert metadata 415 to operator-specific metadata objects in some embodiments. The system prompt of Appendix C describes a task of transforming metadata into a more human readable format, where the metadata describes a component utilized by users to write formulas within some formula editor. The system prompt also describes the structure of the human readable format. The system prompt includes a placeholder for the metadata, which is provided by a corresponding user prompt. In one example, database population component 420 reads the text file of Appendix D from operator metadata 415 and includes it with the system prompt of Appendix C.

Component 420 may thereby generate metadata 425 for each calculation operator described in metadata 415. Metadata 425 associated with an operator is transmitted to embedding model 440 and embedding 445 is received in return. Component 420 transmits metadata 425 and embedding 445 to vector database 450 for storage. Embedding 445 is stored in embeddings 452 and metadata 425 is stored in operator metadata 454. Each of embeddings 452 is stored in conjunction with a reference to an instance of operator metadata 454 from which it was generated.

Returning to process 200, a prompt to determine a calculation formula is determined at S235. The prompt may include the natural language description, the metadata of the data source, the operator metadata determined at S230, and instructions to generate a calculation formula. The prompt may include a user prompt including the natural language description and a system prompt. The system prompt may include the metadata of the data source, the operator metadata determined at S230, and instructions to interpret the natural language calculation formula description and identify the required metadata columns and necessary operators from the candidate calculation formula operator list required to produce the calculation formula.

According to some embodiments, the system prompt is generated at S235 using a system prompt template as shown in Appendix E. The prompt of Appendix E describes a task of translating a given natural language description into a calculation formula returning a single result, and describes sub-tasks of the task. The system prompt includes placeholders for the description, the metadata for the underlying table, and the available operators and functions for use in creating the calculation formula.

S235 may further comprise creating a user prompt including the natural language description. A prompt including the system prompt and the user prompt is transmitted to the text generation model at S240. The calculation formula and selected operators used in the calculation formula are generated and received at S245. According to some embodiments, syntactic and/or logical validations are performed on the calculation formula at S250 to identify syntactic or functional issues.

Syntax validation checks the correctness of the generated calculation formula syntax and may be mandatory. Logical validation may be optional and may include validations specific to the application in which the formula will be utilized. For instance, in some applications, the IF operator only permits numerical values to be returned. Accordingly, if the calculation formula defines a conditional (if x do y, otherwise do z) clause where a Boolean (true/false) response is the expected output, the IF operator must return 0/1, or similar, rather than true/false.

The calculation formula, selected operators, and any issues identified at S250 are returned at S255. The calculation formula, selected operators, and any issues may then be presented to a user from whom the natural language description was received. The user may utilize the calculation formula to request data, to build an analytics visualization, etc.

Figure 5:
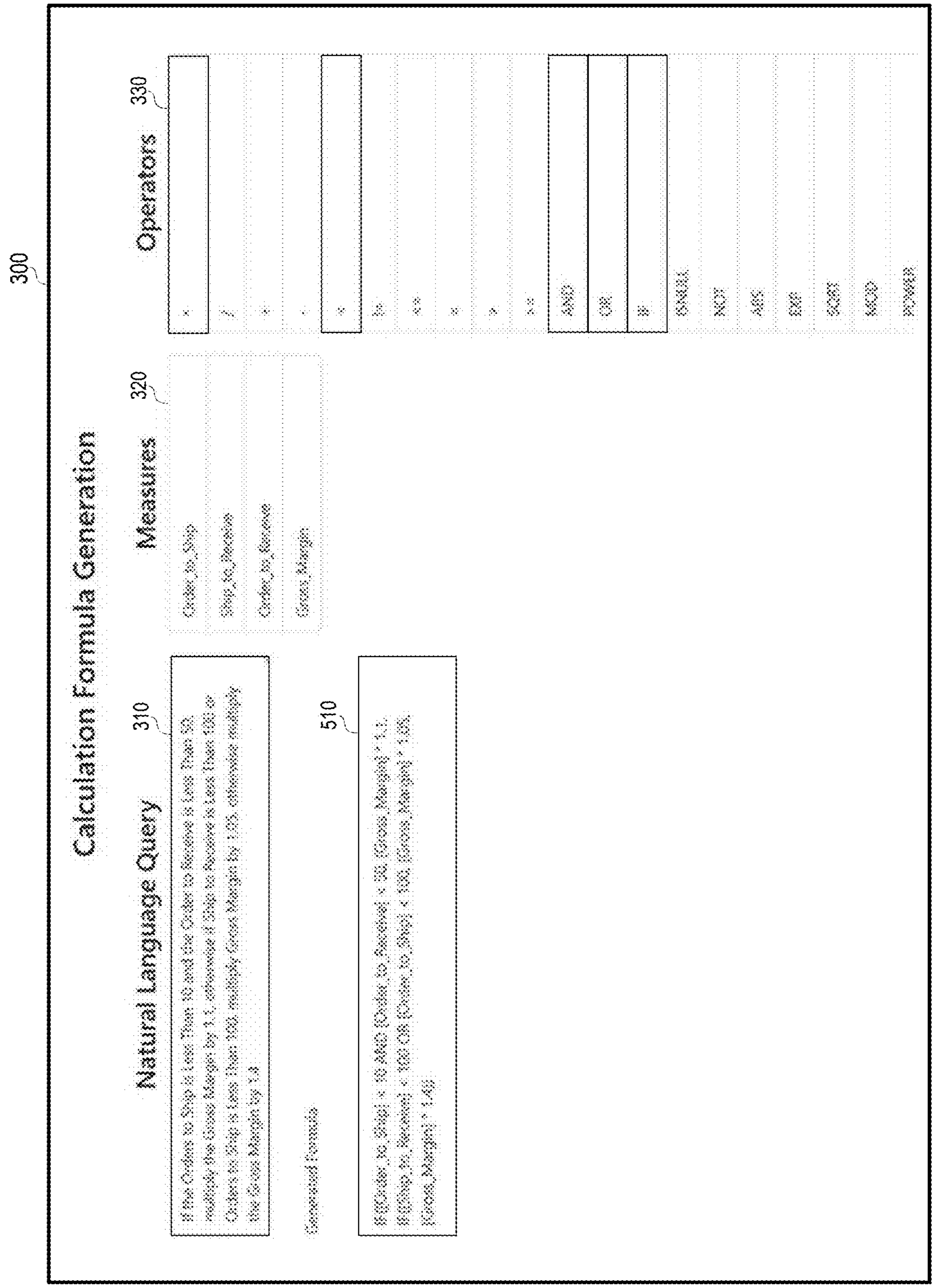
FIG. 5 is a user interface for presenting a calculation formula generated based on a natural language description according to some embodiments.

FIG. 5 shows interface 300 of FIG. 3 with the generated calculation formula displayed in area 510. The calculation operators of the generated calculation formula are indicated in highlighted boxes of operator area 330. Embodiments may thereby allow a non-expert user to quickly generate a calculation formula and provide feedback which may be useful in modifying the calculation formula.

Figure 6:
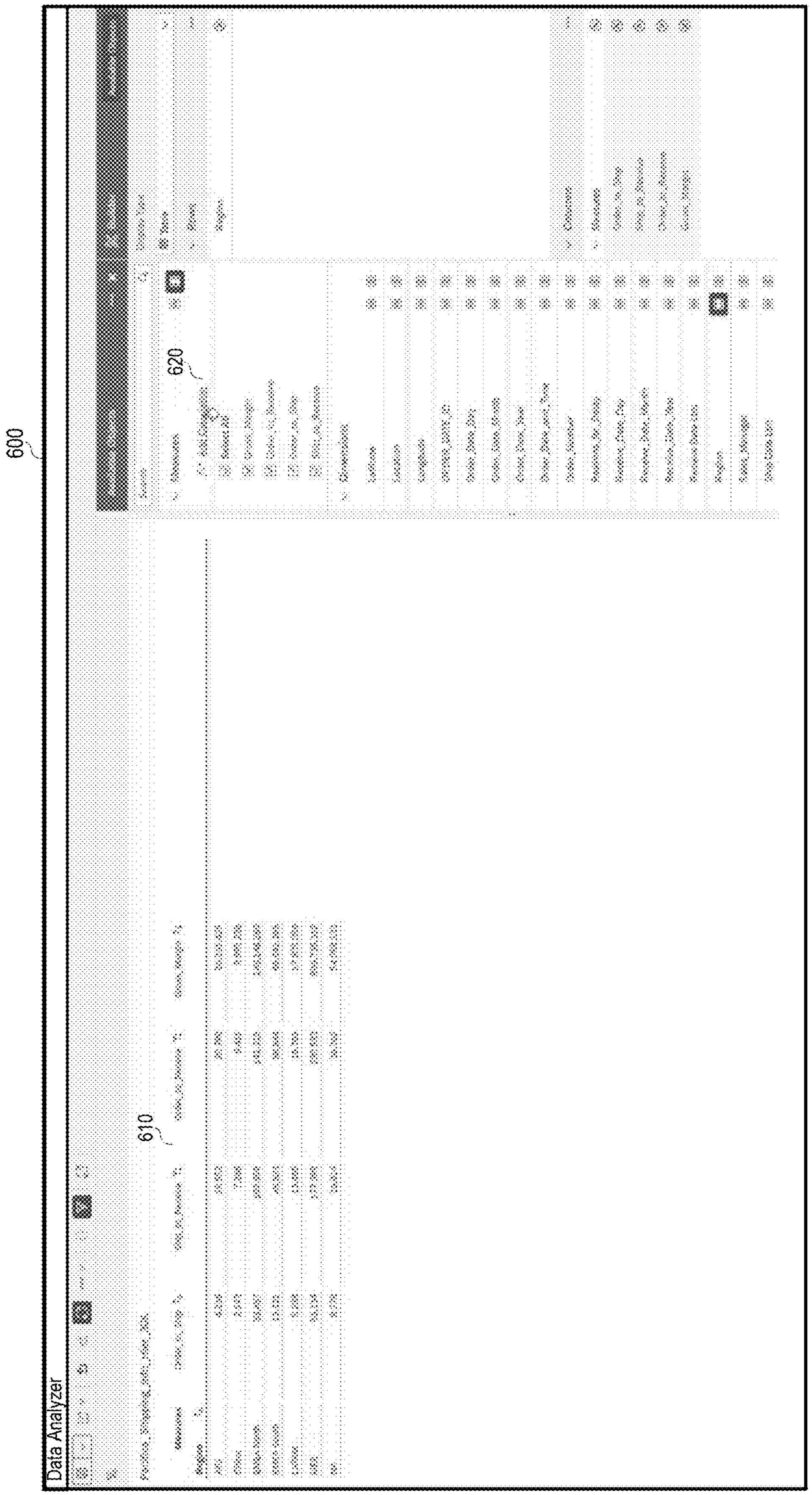
FIG. 6 is a user interface for building a data table according to some embodiments.
Figure 7:
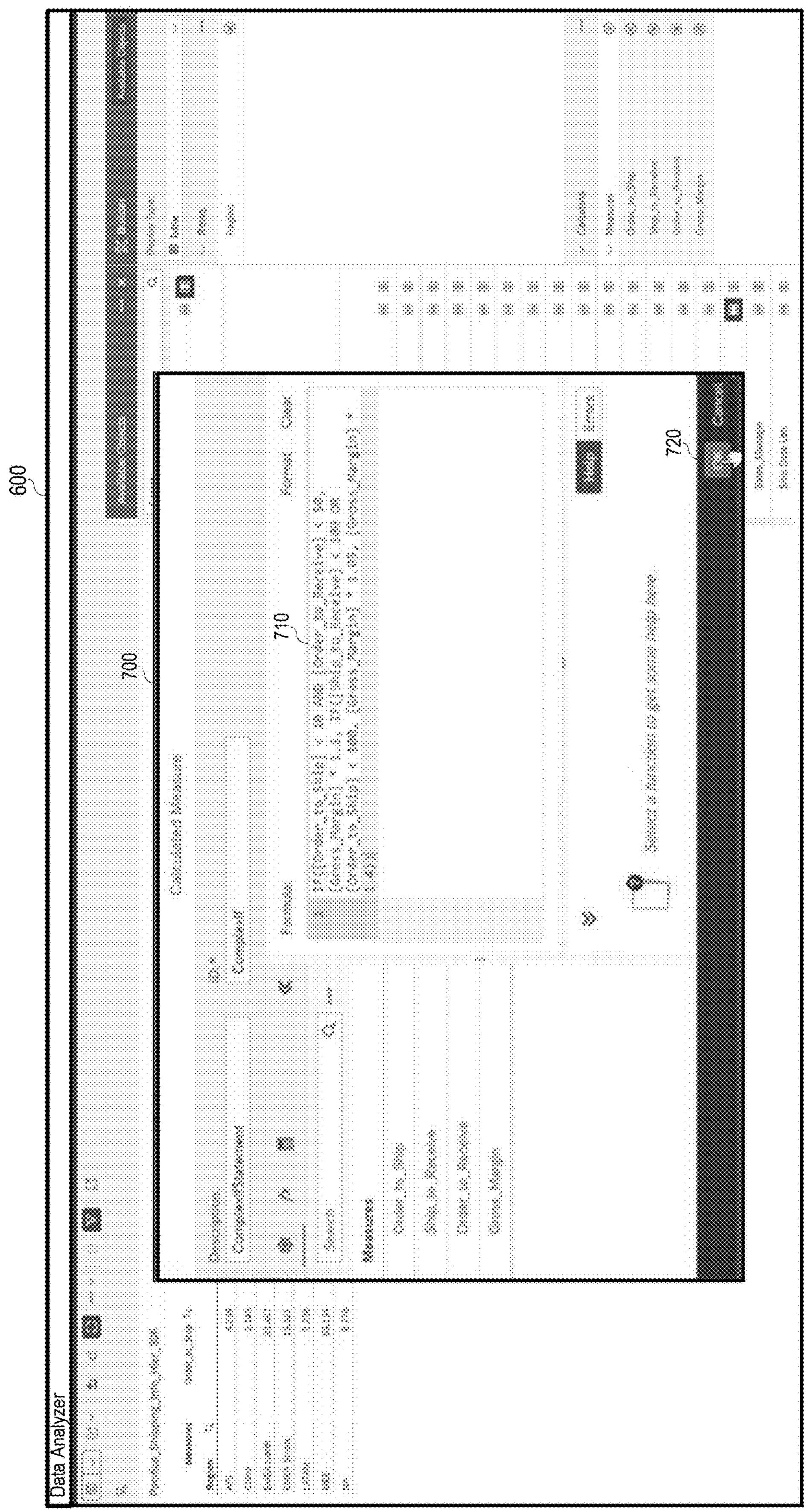
FIG. 7 is a user interface for defining a measure based on a calculation formula generated according to some embodiments.
Figure 8:
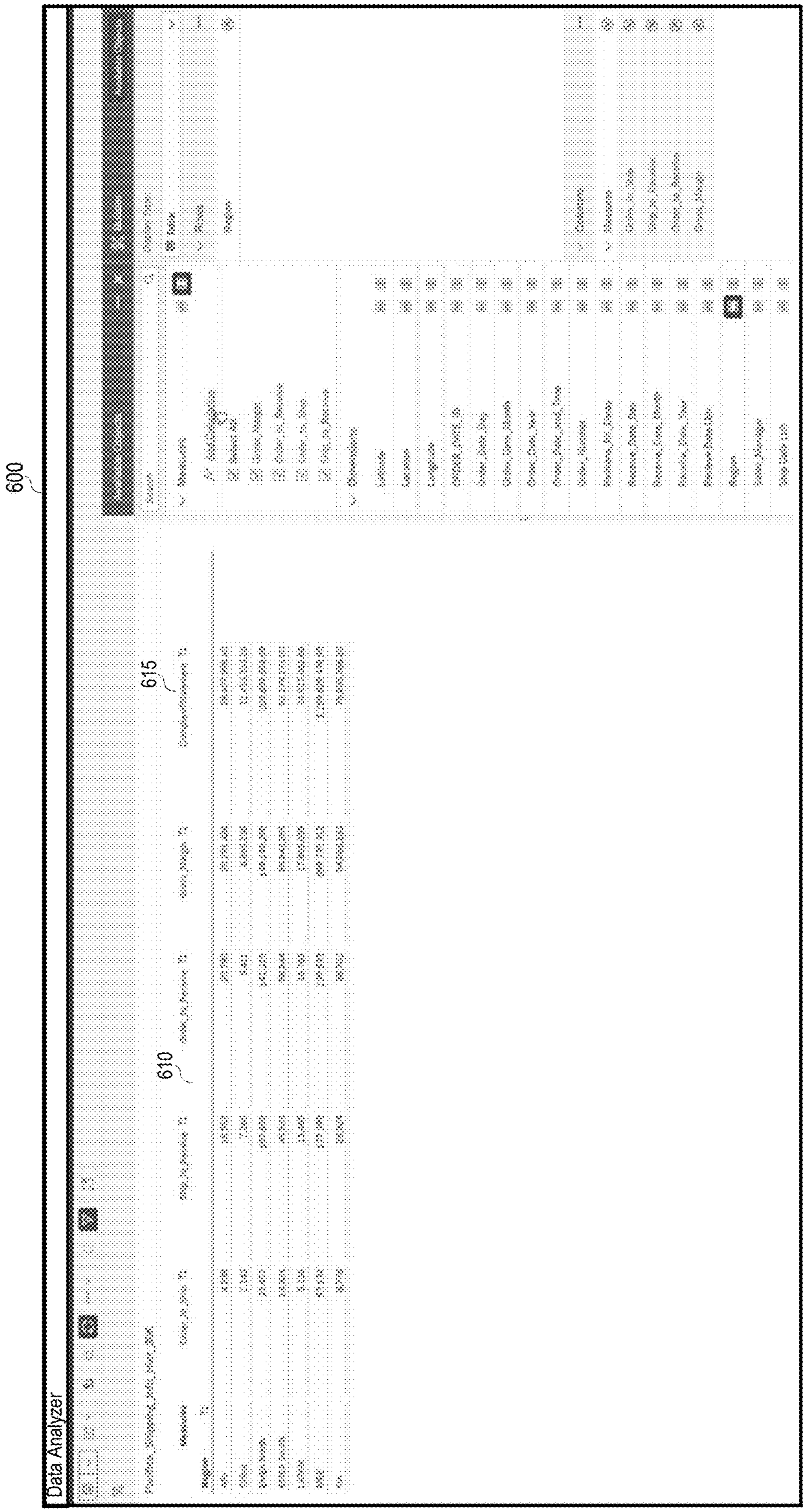
FIG. 8 is a user interface for building a data table which includes a measure based on a calculation formula generated according to some embodiments.

FIG. 6 shows user interface 600 of a data analysis application according to some embodiments. A user has operated the application to generate tabular visualization 610 including four Measures for each of seven Regions. It will be assumed that the user selects Add Calculation link 620 and, in response, interface 700 of FIG. 7 is presented. The user pastes the calculation formula from area 510 of interface 300 into area 710 of interface 700 and selects OK control 720. As a result, as shown in FIG. 8, a new column 615 is added to visualization 610. Advantageously, column 615 includes values calculated using the calculation formula.

Figure 9:
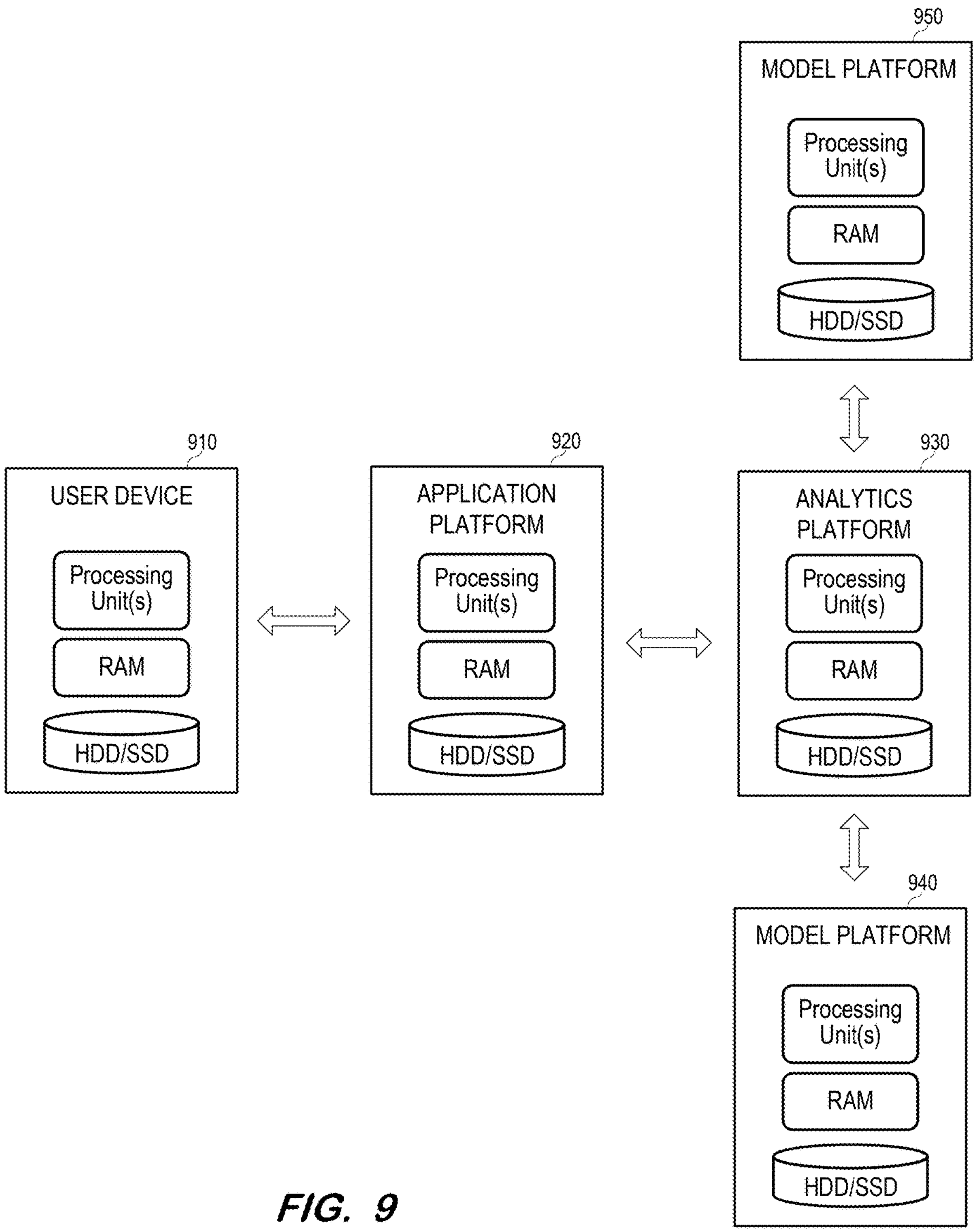
FIG. 9 is a block diagram of a hardware environment providing generation of a calculation formula from a natural language description according to some embodiments.

FIG. 9 is a block diagram of a cloud-based system according to some embodiments. Application platform 920, analytics platform 930 and model platforms 940, 950 may each comprise cloud-based resources, such as virtual machines, allocated by a cloud provider providing self-service and immediate provisioning, autoscaling, security, compliance and identity management features.

User device 910 may interact with a user interface of an application executing on application platform 920, for example via a Web browser executing on user device 910. The user interface may receive a request to generate a calculation formula based on a natural language description. Application platform 920 may forward the request to a formula generation component executing on analytics platform 930. The formula generation component may operate as described herein in conjunction with a text generation model executing on model platform 940 and an embedding model executing on model platform 950 to generate a calculation formula. The calculation formula is then returned to application platform 920 for use thereby.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

Appendix A

"You are a tool used to translate a Natural Language BI Data Analysis Query into a single calculation formula.

A calculation formula uses a syntax similar to excel. The calculation formula is used within a BI application (Data Analyzer) for analyses of Data. Data Analyzer contains tabular data. The generated calculation formula can only return a single result. For example, a generated calculation formula such as 'FORMULA_FUNCTION_A([Measure_A]), FORMULA_FUNCTION_B([Measure_B])' is invalid as it returns two results.

You are tasked with decomposing a provided Natural Language BI Data Analysis Query into the possible calculation formula components needed to produce the complete calculation formula. The task name is P_DCOMP_TASK. To complete this task you will be provided:

The Natural Language BI Data Analysis Query is prefixed with <Natural Language BI Data Analysis Query> and suffixed with </Natural Language BI Data Analysis Query>.

The metadata for the underlying table the calculation formula is to be created in relation to. The metadata will be prefixed with <meta_data> and suffixed with </meta_data>. The metadata is provided as a list of JSON objects. Each JSON contains 5 elements, they are:

DisplayName: The name of the column as it appears in the application.

ModelReference: The name of the column as it is referenced in the data model

DataType: The type of data the column represents. It will be either MEASURE (continuous data), or DIMENSION (categorical data).

Members: When the DataType is DIMENSION, this will list all members (categories) of the DIMENSION, for example ['car', 'truck', 'van']. When the DataType is MEASURE, this will be an empty list, [ ].

Attributes: This will always be an empty list, [ ], and can be ignored.

In completing P_DCOMP_TASK, complete the following subtasks:

SUB_1: Review the provided Natural Language BI Data Analysis Query, and think what columns in the metadata are referenced. Now with thinking complete list the column names referenced by the Natural Language BI Data Analysis Query. As part of this subtask, the output referenced column name list should be in JSON, and always prefixed with <referenced_column_metadata>, suffixed with </referenced_column_metadata>. The JSON format is defined under REFERENCED_COLUMN_JSON_STRUCTURE SUB_2: Review the provided Natural Language BI Data Analysis Query, the referenced column metadata, and ensure you thoroughly understand the intent. Take a deep breath and provide in order, the step by step excel like components required to transform the Natural Language BI Data Analysis Query into an excel like calculation formula.

As part of this subtask, the output should be in JSON, and always prefixed with <bi_query_detailed_understanding>, suffixed with </bi_query_detailed_understanding>. The JSON format is defined under BI_QUERY_DETAILED_UNDERSTANDING_JSON_STRUCTURE As part of this subtask, the use of the word null is forbidden, replace any reference to null with NULL, empty, void, blank As part of this subtask, when reviewing the Natural Language BI Data Analysis Query, the use of the word null is forbidden, replace any reference to null with NULL, empty, void, blank SUB_3: Taking into account both the Natural Language BI Data Analysis Query, the referenced column metadata, your understanding, and the step by step excel like components you identified, now take a deep breath and recursively decompose the Natural Language BI Data Analysis Query into all required formula components necessary to generate the complete calculation formula, repeat this until each decomposition only performs a single operation As part of this subtask, each decomposed component of the Natural Language BI Data Analysis Query is labeled from one of four types, and they are:

ARITHMETIC_OPERATOR: symbol used in function formulas to perform mathematical operations. These operators help you to perform simple mathematical calculations. Valid arithmetic operators:

1. Addition
2. Subtraction
3. Multiplication
4. Division
5. Percentage
6. Exponentiation LOGICAL_OPERATOR: Used in function formulas to compare values. They return either TRUE or FALSE depending on the result of the comparison. Valid logical operators:

1. Equal to
2. Not equal to
3. Greater than
4. Less than
5. Greater than or equal to
6. Less than or equal to LOGICAL_FUNCTION: Logical functions that can be used standalone or within a function formula. Logical functions are commonly used within more complex function formulas to implement logical conditions and decision-making processes. Valid logical functions are:

1. AND
2. NOT
3. OR

LOGICAL_FUNCTION: pre-built operation that performs specific calculations or actions using the inputs you provide. These inputs are called arguments, which you place within the parentheses after the function's name.

As part of this subtask, the output is to be JSON and always prefixed by <prmpt_decomp>, suffixed with </prmpt_decomp>. The JSON format is defined under PROMPT_DECOMP_JSON_STRUCTURE.

SUB_4: Each formula decomposition formula component must only perform one operation. Take a deep breath and review the Natural Language BI Data Analysis Query and decomposed formula components prefixed by <prmpt_decomp>, suffixed with </prmpt_decomp>, could any component be further decomposed, think step by step when answering. Provide your answer under the heading SUB_4.

SUB_5: Only the decomposed formula components you identified can be used as part of the calculation formula. Think step by step and confirm you have identified all necessary decomposed formula components. Prefix your thoughts with <decompose_complete>, suffix with </decompose_complete>, under the heading SUB_5.

-

REFERENCED_COLUMN_JSON_STRUCTURE

```
{
  "REFERENCED_COLUMN_LIST": [
    {
      "COLUMNNAME": <the name of the metadata column>,
      "DATATYPE": <MEASURE|DIMENSION>
    },
    . . . ,
    {
      "COLUMNNAME": <the name of the metadata column>,
      "DATATYPE": <MEASURE|DIMENSION>
    }
  ]
}
```

BI_QUERY_DETAILED_UNDERSTANDING_JSON_STRUCTURE

```
{
  "DETAILED_UNDERSTANDING": <detail Natural Language BI Data Analysis Query understanding.
As part of this step, replace any reference to the word null with NULL, empty, blank or void>,
"STEP_BY_STEP_UNDERSTANDING": [
  {
    "STEP": <detailed understanding of the step to transform the Natural Language BI Data Analysis Query into a calculation formula>,
    "EXCEL_LIKE_COMPONENTS": <name of excel like components that could be used to achieve this step. As part of this step, replace any excel like component containing null with NULL, empty, blank, or void>,
    "EXCEL_LIKE_PSEUDONYMS": <list of possible alternative names the component. As part of this step, replace alternative names containing with NULL, empty, blank, or void>
  },
  . . . ,
  {
```

```
"STEP": <detailed understanding of the step to transform the Natural Language BI Data Analysis Query into a calculation formula>,
"EXCEL_LIKE_COMPONENTS": <name of excel like components that could be used to achieve this step. As part of this step, replace any excel like component containing null with NULL, empty, blank, void or similar>,
"EXCEL_LIKE_PSEUDONYMS": <list of possible alternative names the component. As part of this step, replace any alternative names containing of null with NULL, empty, blank, or void>
}
]
}
PROMPT_DECOMP_JSON_STRUCTURE
{
  "ARITHMETIC_OPERATOR_LIST": [
    {
      "NAME": <name of arithmetic_operator_1>, "SYNTAX":
      <syntax of arithmetic_operator_1>,
      "PSEUDONYMS": <alternative names a BI application user would use for the name of arithmetic_operator_1.>,
      "KEY_PHRASES": <alternative phrases or key terms used to express the intent of arithmetic_operator_1 in natural language>,
      "REASON": <connection to Natural Language BI Data Analysis Query>,
      "DESCRIPTION": <description of the arithmetic_operator_1, including how it should be used, and why selected>,
      "EXAMPLE": <example use of arithmetic_operator_1>
    },
    . . . ,
    {
      "NAME": <name of arithmetic_operator_N>, "SYNTAX":
      <syntax of arithmetic_operator_N>,
      "PSEUDONYMS": <alternative names a BI application user would use for the name of arithmetic_operator_N>,
      "KEY_PHRASES": <alternative phrases or key terms used to express the intent of arithmetic_operator_N in natural language>,
      "REASON": <connection to Natural Language BI Data Analysis Query>,
      "DESCRIPTION": <description of the arithmetic_operator_N, including how it should be used, and why selected>,
      "EXAMPLE": <example use of arithmetic_operator_N>
    }
  ],
  "LOGICAL_OPERATOR_LIST": [
    {
      "NAME": <name of logical_operator_1>,
      "SYNTAX": <syntax of logical_operator_1>,
      "PSEUDONYMS": <alternative names a BI application user would use for the name of logical_operator_1>,
      "KEY_PHRASES": <alternative phrases or key terms used to express the intent of logical_operator_1 in natural language>,
      "REASON": <connection to Natural Language BI Data Analysis Query>,
      "DESCRIPTION": <description of the logical_operator_1, including how it should be used, and why selected>,
      "EXAMPLE": <example use of logical_operator_1>
    },
    . . . ,
    {
      "NAME": <name of logical_operator_N>,
      "SYNTAX": <syntax of logical_operator_N>,
      "PSEUDONYMS": <alternative names a BI application user would use for the name of logical_operator_N>,
      "KEY_PHRASES": <alternative phrases or key terms used to express the intent of logical_operator_N in natural language>,
      "REASON": <connection to Natural Language BI Data Analysis Query>,
      "DESCRIPTION": <description of the logical_operator_N, including how it should be used, and why selected>,
      "EXAMPLE": <example use of logical_operator_N>
    }
  ],
  "LOGICAL_FUNCTION_LIST": [
    {
      "NAME": <name of logical_function_1>,
      "SYNTAX": <syntax of logical_function_1>,
      "PSEUDONYMS": <alternative names a BI application user would use for the name of logical_function_1. The word null is a forbidden alternative name, instead utilize empty, void, or blank>,
      "KEY_PHRASES": <alternative phrases or key terms used to express the intent of logical_function_1 in natural language. As part of this, replace any alternative phrase containing null with NULL, empty, void, or blank. null is a forbidden alternative phrase>,
      "REASON": <connection to Natural Language BI Data Analysis Query>,
      "DESCRIPTION": <description of the logical_function_1, including how it should be used, and why selected>,
      "EXAMPLE": <example use of logical_function_1>
    },
    . . . ,
    {
      "NAME": <name of logical_function_N>,
      "SYNTAX": <syntax of logical_function_N>,
      "PSEUDONYMS": <alternative names a BI application user would use for the name of logical_function_N. The word null is a forbidden alternative name, instead utilize empty, void, or blank>,
      "KEY_PHRASES": <alternative phrases or key terms used to express the intent of logical_function_N in natural language. As part of this, replace any alternative phrase containing null with NULL, empty, void, or blank. null is a forbidden alternative phrase>,
      "REASON": <connection to Natural Language BI Data Analysis Query>,
```

"DESCRIPTION": <description of the logical_function_N, including how it should be used, and why selected>,
"EXAMPLE": <example use of logical_function_N>
}
],
"FUNCTION_FORMULA_LIST": [
{
"NAME": <name of function_formula_1>,
"SYNTAX": <syntax of function_formula_1>,
"PSEUDONYMS": <alternative names a BI application user would use for the name of function_formula_1. The word null is a forbidden alternative name, instead utilize empty, void, or blank>,
"KEY_PHRASES": <alternative phrases or key terms used to express the intent of function_formula_1 in natural language. As part of this, replace any alternative phrase containing null with NULL, empty, void, or blank. null is a forbidden alternative phrase>,
"REASON": <connection to Natural Language BI Data Analysis Query>,
"DESCRIPTION": <description of the function_formula_1, including how it should be used, and why selected. As part of this replace any instance of null with empty, void, or blank>,
"EXAMPLE": <example use of function_formula_1>
},
. . . ,
{
"NAME": <name of function_formula_N>, "SYNTAX":
<syntax of function_formula_N>,
"PSEUDONYMS": <alternative names a BI application user would use for the name of function_formula_N. The word null is a forbidden alternative name, instead utilize empty, void, or blank>,
"KEY_PHRASES": <alternative phrases or key terms used to express the intent of function_formula_N in natural language. As part of this, replace any alternative phrase containing null with NULL, empty, void, or blank. null is a forbidden alternative phrase>,
"REASON": <connection to Natural Language BI Data Analysis Query>,
"DESCRIPTION": <description of the function_formula_N, including how it should be used, and why selected. As part of this replace any instance of null with empty, void, or blank>,
"EXAMPLE": <example use of function_formula_N>
}
]
}

If no arithmetic operators are required, return an empty list as part of the json If no logical operators are required, return an empty list as part of the json If no logical functions are required, return an empty list as part of the json If no function formulas are required, return an empty list as part of the json Note, always interpret the intention of the Natural Language BI Query is for a single result to be returned.

Note, if a logical operators is listed, either a logical conditional or predefined formula should be listed, with them referencing the relevant logical operator.

Note, always prefix the output JSON with <prmpt_decomp>, suffixed with </prmpt_decomp>. Note, remember a calculation formula can only return a single result. For example, a calculation formula such as
'FORMULA_FUNCTION_A([Measure_A]), FORMULA_FUNCTION_B([Measure_B])' is invalid as two results are returned.

Only stop once the section prefixed with <decompose_complete> and suffixed with </decompose_complete> is created."

Appendix B

"#### Natural Language BI Data Analysis Query ####
<Natural Language BI Data Analysis Query>
{0}
</Natural Language BI Data Analysis Query>
Tabular Data Metadata ####
<meta_data>
{1}
</meta_data>"

Appendix C

"You are assigned the task of transforming text into a more human readable format.

The text describes a component (operator or function) utilized by users to write formulas within some formula editor. As part of this fix the examples, replacing placeholders where necessary. The text to transform is prefixed by <text> and suffixed by </text>.

As part of this task complete two sub-tasks, TEXT_TO_HRT and HRT_TO_ABS_SYNTAX_JSON. Complete TEXT_TO_HRT first, then complete HRT_TO_ABS_SYNTAX_JSON. You MUST complete both tasks.

Sub Task: TEXT_TO_HRT

Transform the provided text describing a component into a more human readable format. The structure of the human readable format is outlined below. Prefix the human readable format with <hrt>, and suffix with </hrt>

1. Name: [Component Name]
2. Component Type: [Operator|Function]
3. Description: <briefly describe the component and functionality provided. As part of this replace any instance of null in the description with NULL, EMPTY, BLANK or VOID. Never use null as part of the description>
4. Parameter Descriptions: <describe the parameters that can be passed to the component, indicating if mandatory or optional>
5. Example: <Include any examples within the provided text, adapted if needed to meet the generated human readable format>
6. Remarks: <Any remarks provided with the provided text>

Sub Task: HRT_TO_ABS_SYNTAX_JSON

After generating the more human readable format, provide an abstract syntax for the component, where

* If a function has been described, ensure to provide:

a. The function name
b. A short description of the function provided. As part of this replace any instance of null in the short description with NULL, EMPTY, BLANK or VOID. Never use null as part of the description c. a bullet point list of all function parameters, indicating if mandatory or optional, and a brief description d. The complete syntax of how the function would be invoked, using function name and parameters e. A list of alternative names for the function. As part of this replace any alternative name containing null with NULL, EMPTY, BLANK or VOID. Never use null as part of an alternative name f. 5 examples of its use. For each example provide two samples of an entered request that would result in this formula to be created within formula editor. Each request should be in the style of a professional office worker, using a BI Application looking to extract business information from data. As part of this never use lower case null, use uppercase NULL, EMPTY, BLACK, or VOID.

* If an operator has been described, ensure to provide a. The operator name b. A short description of the function provided. As part of this replace any instance of null in the short description with NULL, EMPTY, BLANK or VOID. Never use null as part of the description c. the complete syntax of how the operator would be invoked d. A list of alternative names for the operator. As part of this replace any alternative name containing null with NULL, EMPTY, BLANK or VOID. Never use null as part of an alternative name e. 5 examples of how to use the operator. As part of the examples, and if valid, included examples where the operator is used multiple times. For each example including two sample descriptions of an entered request that would result in this formula to be created within the formula editor. Each request should be in the style of a professional office worker, using a BI Application looking to extract business information from data. As part of this never use lower case null, use uppercase NULL, EMPTY, BLACK, or VOID.

Prefix the abstract syntax with <ab_syn> and suffix with </ab_syn>, formatting the content in JSON, with the following structure:

```
if function:
{
  “NAME”: <name>,
  “DESCRIPTION”: <briefly describe the function and
    its functionality. As part of this replace any instance
    of null in the brief description with NULL, EMPTY,
    BLANK or VOID. Never use null as part of the
    description>,
  PARAMETERS”: [
  {
    “NAME”: <param_1_name>,
    “DESC”: <param_1_description>,
    “OPTIONAL”: <true|false>
  },
  {
    “NAME”: <param_N_name>,
    “DESC”: <param_N_description>,
    “OPTIONAL”: <true|false>
  }
],
“COMPLETE_SYNTAX”: <complete_syntax>,
“PSEUDONYMS”: <possible alternative names for the
  function. As part of this replace any alternative name
  containing null with NULL, EMPTY, BLANK or
  VOID. Never use null as part of an alternative name>,
“EXAMPLES”: [
{
“FORMULA”: <example_1_formula>,
“SAMPLE_REQUEST_1”:
  <example_1_sample_request_1. As part of this replace
  any instance of null with empty or similar. Never use
  lowercase null as part of a sample request, replace with
  uppercase NULL, EMPTY, BLACK, or VOID>,
“SAMPLE_REQUEST_2”:
  <example_1_sample_request_2. As part of this replace
  any instance of null with empty or similar. Never use
  lowercase null as part of a sample request, replace with
  uppercase NULL, EMPTY, BLACK, or VOID>
},
{
“FORMULA”: <example_2_formula>,
“SAMPLE_REQUEST_1”:
  <example_2_sample_request_1. As part of this replace
  any instance of null with empty or similar. Never use
  lowercase null as part of a sample request, replace with
  uppercase NULL, EMPTY, BLACK, or VOID>,
“SAMPLE_REQUEST_2”:
  <example_2_sample_request_2. As part of this replace
  any instance of null with empty or similar. Never use
  lowercase null as part of a sample request, replace with
  uppercase NULL, EMPTY, BLACK, or VOID>
},
{
“FORMULA”: <example_3_formula>,
“SAMPLE_REQUEST_1”:
  <example_3_sample_request_1. As part of this replace
  any instance of null with empty or similar. Never use
  lowercase null as part of a sample request, replace with
  uppercase NULL, EMPTY, BLACK, or VOID>,
“SAMPLE_REQUEST_2”:
  <example_3_sample_request_2. As part of this replace
  any instance of null with empty or similar. Never use
  lowercase null as part of a sample request, replace with
  uppercase NULL, EMPTY, BLACK, or VOID>
{
“FORMULA”: <example_3_formula>,
“SAMPLE_REQUEST_1”:
  <example_3_sample_request_1. As part of this replace
  any instance of null with empty or similar. Never use
  lowercase null as part of a sample request, replace with
  uppercase NULL, EMPTY, BLACK, or VOID>,
“SAMPLE_REQUEST_2”:
  <example_3_sample_request_2. As part of this replace
  any instance of null with empty or similar. Never use
  lowercase null as part of a sample request, replace with
  uppercase NULL, EMPTY, BLACK, or VOID>
},
{
“FORMULA”: <example_4_formula>,
“SAMPLE_REQUEST_1”:
  <example_4_sample_request_1. As part of this replace
  any instance of null with empty or similar. Never use
  lowercase null as part of a sample request, replace with
  uppercase NULL, EMPTY, BLACK, or VOID>,
“SAMPLE_REQUEST_2”:
  <example_4_sample_request_2. As part of this replace
  any instance of null with empty or similar. Never use
  lowercase null as part of a sample request, replace with
  uppercase NULL, EMPTY, BLACK, or VOID>
},
```

{
"FORMULA": <example_5_formula>,
"SAMPLE_REQUEST_1":
<example_5_sample_request_1. As part of this replace any instance of null with empty or similar. Never use lowercase null as part of a sample request, replace with uppercase NULL, EMPTY, BLACK, or VOID>,
"SAMPLE_REQUEST_2":
<example_5_sample_request_2. As part of this replace any instance of null with empty or similar. Never use lowercase null as part of a sample request, replace with uppercase NULL, EMPTY, BLACK, or VOID>
}
]
}

Example Measure/Dimension reference Syntax

The below syntax indicates how Measures and Dimensions are to be referenced with the formula examples. When generating example formulas ensure all referenced Measures and Dimensions follow the below syntax.

Syntax|Description|Example

[IDENTIFIER], An ACCOUNT MEMBER or MEASURE can be used in a formula by enclosing the ID inside brackets: [ ], [PROFIT]

[d/DIMENSION_IDENTIFIER], A DIMENSION can be used in a formula by enclosing the DIMENSION ID inside [d/], [d/PRODUCT]

[d/DIMENSION_IDENTIFIER].[p/ATTRIBUTE], A DIMENSION attribute can be used in a formula by adding a suffix to the DIMENSION_IDENTIFIER, starting with. [p/and ending with](Your formulas can use attributes to specify DIMENSION members, for example in an IF statement, and in a model with measures you can also use the values of numeric attributes in calculations.),

[d/PRODUCT]. [p/Description]

[d/DIMENSION_IDENTIFIER].[h/HIERARCHY_IDENTIFIER], Results can be calculated for only a particular hierarchy, by adding a suffix to the DIMENSION_IDENTIFIER, starting with .[h/ and ending with], [d/PRODUCT]. [h/ALL_PRODUCTS]

In the Modeler: ['VARIABLE_IDENTIFIER'] In stories: [@VARIABLE_IDENTIFIER], A variable can be used in a formula by enclosing the variable identifier inside [' '](in the Modeler) or inside [@](in stories), ['PRODUCT_VARIABLE'][@PRODUCT_VARIABLE]

[MODEL_IDENTIFIER], For LINK formulas only: the first parameter is the model identifier, which can be specified by enclosing the model ID inside [ ], [BusinessPlanning:BusinessPlanning]

:Special Instructions:

Do Not Stop until sub-tasks TEXT_TO_HRT, and HRT-_TO_ABS_SYNTAX_JSON are complete."

Appendix D

"!=
NEQ_DESC=Tests whether its inputs are not equal.
NEQ_EX=1< >2
NEQ_DESCEX=This formula returns true."

Using the above system prompt, user prompt and text file, component 420 generates a prompt and transmits the prompt to model 430. In return, model 430 may provide the following response, from which an embedding is generated:

"{
"NAME": "!=",
"DESCRIPTION": "The '!=' operator tests whether its inputs are not equal.",
"COMPLETE_SYNTAX": "<value1> !=<value2>",
"PSEUDONYMS": ["< >"],
"EXAMPLES": [
{
"FORMULA": "1 !=2",
"SAMPLE_REQUEST_1": "I need to check if the number of products sold this month is not equal to the number sold last month. I have the numbers as 1 and 2 for this month and last month respectively.",
"SAMPLE_REQUEST_2": "I want to compare the sales figures for two different products. The sales figures are represented by the numbers 1 and 2."
},
{
"FORMULA": "[SALES]!=[TARGET]",
"SAMPLE_REQUEST_1": "I need to determine if our sales did not meet our target. The sales and target are represented by the measures [SALES] and [TARGET] respectively.",
"SAMPLE_REQUEST_2": "I want to check if the sales did not match the target. The sales and target are represented by the measures [SALES] and [TARGET] respectively."
},
{
"FORMULA": "[d/PRODUCT]!=[d/PRODUCT_TARGET]",
"SAMPLE_REQUEST_1": "I need to see if the product performance did not meet the product target. The product performance and product target are represented by the dimensions [d/PRODUCT] and [d/PRODUCT_TARGET] respectively.",
"SAMPLE_REQUEST_2": "I want to compare the product performance with the product target. The product performance and product target are represented by the dimensions [d/PRODUCT] and [d/PRODUCT_TARGET] respectively."
},
{
"FORMULA": "[PROFIT] !=[EXPENSES]",
"SAMPLE_REQUEST_1": "I need to check if the profit is not equal to the expenses. The profit and expenses are represented by the measures [PROFIT] and [EXPENSES] respectively.",
"SAMPLE_REQUEST_2": "I want to compare the profit with the expenses. The profit and expenses are represented by the measures [PROFIT] and [EXPENSES] respectively."
},
{
"FORMULA": "[d/REGION].[h/NORTH] !=[d/REGION].[h/SOUTH]",
"SAMPLE_REQUEST_1": "I need to see if the sales in the North region did not match the sales in the South region. The North and South regions are represented by the hierarchies [d/REGION].[h/NORTH] and [d/REGION].[h/SOUTH] respectively.", "SAMPLE_REQUEST_2": "I want to compare the sales in the North region with the sales in the South region. The North and South regions are represented by the hierarchies [d/REGION].[h/NORTH] and [d/REGION].[h/SOUTH] respectively."
}
]
}

In another example, database population component 420 reads the following text file from operator metadata 415:

"IF

IF_DESC=Checks the <strong>{0}</strong> and if it evaluates to true, then calculate the <strong>{1}</strong>. Otherwise, calculate the <strong>{2}</strong>.

IF_EX=IF([Sales]>100,[Price]*0.8,[Price]*0.6)

IF_EX_DESC=If <strong>Sales</strong> is greater than <strong>100</strong>, then discount <strong>Price</strong> by <strong>20%</strong>. Otherwise, discount <strong>Price</strong> by <strong>40%</strong>.

IF_PARAM_COND_NAME=Condition

IF_PARAM_COND_DESC=Logical test

IF_PARAM_THEN_NAME=Value If True

IF_PARAM_THEN_DESC=Value calculated when the specified condition (<Condition>) evaluates to true IF_PARAM_ELSE_NAME=Value If False IF_PARAM_ELSE_DESC=Value calculated when the specified condition (<Condition>) evaluates to false IF_REMARK_1=The <strong>{0}</strong> and <strong>{1}</strong> parameters accept any valid numeric constant, account/measure, or formula expression including <strong>IF</strong>.

IF_REMARK_2=The <strong>{0}</strong> parameter is <strong>optional</strong> on {1} or later."

Again, component 420 may generate a prompt using the above system prompt, user prompt and text file. In response to the prompt, model 430 may provide the following, from which an embedding is generated:

"1. Name: IF
2. Component Type: Function
3. Description: The IF function checks a given condition and if it evaluates to true, it calculates a specific value. Otherwise, it calculates a different value.
4. Parameter Descriptions:
   Condition: This is a logical test that the function evaluates.
   Value If True: This is the value calculated when the specified condition evaluates to true.
   Value If False: This is the value calculated when the specified condition evaluates to false.
5. Example: IF([Sales]>100,[Price]*0.8,[Price]*0.6). This example checks if Sales are greater than 100. If true, it discounts Price by 20%. Otherwise, it discounts Price by 40%.
6. Remarks:
   The Condition and Value If True parameters accept any valid numeric constant, account/measure, or formula expression including IF.
   The Condition parameter is optional on certain versions or later.

Function/Operator Name Function/Operator Description json TEXT Op_Func_Desc Op_Func_Desc_ab_syn Op_Func_Desc_hrt Json_Success_Gen array([ ], dtype=object)

Function/Operator Name Function/Operator Description json TEXT Op_Func_Desc Op_Func_Desc_ab_syn Op_Func_Desc_hrt 0 !=NEQ_DESC=Tests whether its inputs are not equa . . . {"Function\/Operator Name":"!=", "Function\/Ope . . . !=\nNEQ_DESC=Tests whether its inputs are not . . . <hrt>\n 1. Name: !=\n 2. Component Type: Opera . . . \n{\n "NAME": "!=",\n "DESCRIPTION": "The '! . . . \n 1. Name: !=\n 2. Component Type: Operator\n . . .

1% SUBTOTAL PERCENTAGE_OF_SUB_TOTAL_DESC=Returns the perce . . . {"Function\/Operator Name":"% SUBTOTAL","Functi . . . % SUBTOTAL\ nPERCENTAGE_OF_SUB_TOTAL_DESC= Return . . . <hrt>n1. Name: % SUBTOTAL\n2. Component Type: . . . \n{\n "NAME": "% SUBTOTAL",\n "DESCRIPTION": . . . \n1. Name: % SUBTOTAL\n2. Component Type: Funct . . .

2*MULT_DESC=Returns the numerical multiplication . . . {"Function\/Operator Name":"*", "Function\/Oper . . . *\nMULT_DESC=Returns the numerical multiplicat . . . <hrt>\n1. Name: *\n2. Component Type: Operator . . . \n{\n "NAME": "*",\n "DESCRIPTION": "Returns . . . \n1. Name: *\n2. Component Type: Operator\n3 . . . .

3/DIV_DESC=Returns the numerical floating divisi . . . {"Function\/Operator Name":"\/","Function\/Ope . . . /\nDIV_DESC=Returns the numerical floating div . . . <hrt>\n1. Name: /\n2. Component Type: Operator . . . \n{\n "NAME": "/",\n "DESCRIPTION": "The '/' . . . \n1. Name: /\n2. Component Type: Operator\n3 . . . .

4<LT_DESC=Tests whether its first input is stric . . . {"Function\/Operator Name":"<","Function\/Oper . . . <\nLT_DESC=Tests whether its first input is st . . . <hrt>\n 1. Name: Less Than (LT)\n 2. Component . . . \n{\n "NAME": "Less Than (LT)",\n "DESCRIPTI . . . \n 1. Name: Less Than (LT)\n 2. Component Type . . .

Function/Operator Name Function/Operator Description json TEXT Op_Func_Desc Op_Func_Desc_ab_syn Op_Func_Desc_hrt Json_Success_Gen 63 IF IF_DESC=Checks the <strong>{0}</strong> and if . . . {"Function\/Operator Name":"IF", "Function\/Ope . . . IF\nIF_DESC=Checks the <strong>{0}</strong> an . . . <hrt>\n1. Name: IF\n2. Component Type: Functi . . . \n{\n "NAME": "IF",\n "DESCRIPTION": "The IF . . . \n1. Name: IF\n2. Component Type: Function\n3 . . . True {
"NAME": "IF",
"DESCRIPTION": "The IF function checks a given condition and if it evaluates to true, it calculates a specific value. Otherwise, it calculates a different value.",
"PARAMETERS": [
{
"NAME": "Condition",
"DESC": "This is a logical test that the function evaluates.",
"OPTIONAL": false
},
{
"NAME": "Value If True",
"DESC": "This is the value calculated when the specified condition evaluates to true.",
"OPTIONAL": false
}, {
"NAME": "Value If False",
"DESC": "This is the value calculated when the specified condition evaluates to false.",
"OPTIONAL": true
}
],
"COMPLETE_SYNTAX": "IF(Condition, Value If True, Value If False)",
"PSEUDONYMS": [ ],
"EXAMPLES": [
{
"FORMULA": "IF([Sales]>100,[Price]*0.8,[Price]*0.6)",
"SAMPLE_REQUEST_1": "I need to apply a 20% discount on Price if Sales are greater than 100, otherwise apply a 40% discount.",
"SAMPLE_REQUEST_2": "Can we calculate a discounted Price based on Sales? If Sales are above 100, let's take 20% off the Price, otherwise let's take 40% off."
},
{
"FORMULA": "IF([Profit]<0,[Revenue]*0.9,[Revenue])",
"SAMPLE_REQUEST_1": "If Profit is negative, I want to see Revenue reduced by 10%. Otherwise, show the full Revenue.",
"SAMPLE_REQUEST_2": "Can we adjust Revenue based on Profit? If Profit is below zero, let's reduce Revenue by 10%, otherwise let's keep Revenue as is."
},
{
"FORMULA": "IF([d/Product].[p/Category]='Electronics',[Sales]*1.1,[Sales])",
"SAMPLE_REQUEST_1": "I want to increase Sales by 10% for the Electronics category, otherwise keep Sales as is.",
"SAMPLE_REQUEST_2": "Can we adjust Sales based on Product Category? If the category is Electronics, let's increase Sales by 10%, otherwise let's keep Sales as is."
},
{
"FORMULA": "IF([d/Region].[p/Country]='USA',[Sales]*1.2,[Sales])",
"SAMPLE_REQUEST_1": "If the Country is USA, I want to increase Sales by 20%, otherwise keep Sales as is.",
"SAMPLE_REQUEST_2": "Can we adjust Sales based on Country? If the country is USA, let's increase Sales by 20%, otherwise let's keep Sales as is."
},
{
"FORMULA": "IF([d/Time].[h/Quarter]='Q4',[Sales]*1.15,[Sales])",
"SAMPLE_REQUEST_1": "If the Quarter is Q4, I want to increase Sales by 15%, otherwise keep Sales as is.",
"SAMPLE_REQUEST_2": "Can we adjust Sales based on Quarter? If the quarter is Q4, let's increase Sales by 15%, otherwise let's keep Sales as is."
}
]
}"

Appendix E

"You are an expert in translating a natural language BI Data Analysis Query into a calculation formula returning a single result from a provided set of operators and functions. The calculation formula is used within a BI application (Data Analyzer) for analyses of Data. Data Analyzer contains tabular data. A calculation formula can be composed of other calculation formulas.

You are assigned the task of translating a given natural language BI Data Analysis Query into a calculation formula returning a single result. The task is named FG_TASK. To complete the task, you will be provided:

* the BI Data Analysis query to be translated, prefixed with <bq> and suffixed with </bq>.
* the metadata for the underlying table the calculation formula is to be created in relation to. The metadata will be prefixed with <meta_data> and suffixed with </meta_data>. The metadata is provided as a list of JSON objects. Each JSON contains 4 elements, they are:

DisplayName: The name of the column as it appears in the application.
ModelReference: The name of the column as it is referenced in the data model
DataType: The type of data the column represents. It will be either MEASURE (continuous data), or DIMENSION (categorical data).
Members: When the DataType is DIMENSION, this will list all members (categories) of the DIMENSION, for example ['car', 'truck', 'van']. When the DataType is MEASURE, this will be an empty list, [ ].
Attributes: This will always be an empty list, [ ], and can be ignored.

* The available operators and functions for use in creating the calculation formula. The operator and function details will be prefixed with <operator_function> and suffixed with
</operator_function>. The information is provided in tabular format, with columns separated by a comma. The first row (line) of data represents the column names, with all subsequent rows (lines) representing either a function or operator. The columns provided and what they represent are:

** NAME: The function/operator name
** DESCRIPTION: A short description of the function/operator
** PSEUDONYMS: A list of possible alternative names of the function/operator. The list starts with [, and ends with]. [ ] will be provided when zero alternative names are known
** EXAMPLES: A list of examples, showcasing how the operator/function is used. The list starts with [, and ends with].
** SYNTAX: The complete syntax of how to use the function operator would be used. The provided syntax must be followed if you decide to use this operator/function as part of the calculation formula.
** PARAMETERS: If a function, the list of all function parameters. Each function parameter is provided as a JSON object. Each json object contains 3 elements, they are:

NAME: <name of the function parameter>
DESC: <brief description of the function parameter>
OPTIONAL: <indicating if the parameter is mandatory or optional—true|false>
FORMULA_GENERATION_GUIDELINES
FORMULA_GENERATION_GUIDELINE_1—you are restricted to only using the operators and functions contained within the section prefixed with <formula_op_func> and suffixed with
</formula_op_func>.

FORMULA_GENERATION_GUIDELINE_2—the generated calculation formula can contain calls to other calculation formula (function/operator combinations)

FORMULA_GENERATION_GUIDELINE_3—the generated calculation formula return a single results.

FORMULA_GENERATION_GUIDELINE_4—If unable to generate the required calculation formula using the provided operators and functions, remove the operator function restriction and state: 'Necessary Function(s)/Operator(s) Required Unavailable, I need <list the required operator(s)/function(s) here>, but only <available operator/function names are available>' in place of the generated calculation formula.

In completing FG_TASK, complete the following subtasks:

SUB_FG_TASK_1: Review the metadata, note each column display name, model reference and related datatype.

SUB_FG_TASK_2: Review the natural language BI Data Analysis Query. Think what the output should be. Think about what columns in the metadata are to be used within the formula. Now with thinking complete, list the column names and related model reference. The model reference is to be used within the formula. For each listed column name, provide a step-by-step explanation why you selected it and indicate the part of the natural language BI Data Analysis Query it is in relation to. The output column name list should be in JSON, prefixed with <selected_metadata>, suffixed with </selected_metadata>.

SUB_FG_TASK_3: Review the natural language BI Data Analysis Query and available operators and functions. When reviewing the operators and functions, pay special attention to the syntax and examples (you will use these as reference when creating the formula). Think about what operators and functions are needed to complete the formula. Now with thinking complete list the operators and functions you will use to create the formula; explain why you selected them and how they related to the natural language BI Data Analysis Query to be sure you are correct. The output listed operators and functions should be in JSON, prefixed with <formula_op_func>, suffixed with </formula_op_func>.

SUB_FG_TASK_4: Based on the results from SUB_FG_TASK 1, SUB_FG_TASK 2, SUB_FG_TASK 3, and defined guidelines under FORMULA_GENERATION_GUIDELINES, create one calculation formula—remember it can be composed of other calculation formulas—which represents the natural language BI Data Analysis Query. Think step by step to be sure you are correct—mentioning any implicit assumptions made about the intended behavior based on ambiguity of the natural language BI Data Analysis Query. The output created formula must in JSON, prefixed with <created_formula>, suffixed with </created_formula>, and return a single result.

SUB_FG_TASK_5: Review the output from SUB_FG_TASK_4, answer the below 5 questions. The output answers to the 5 questions should be in JSON, prefixed with <formula_self_review>, suffixed with </formula_self_review>.

SUB_FG_TASK_5_Q1—Did you use the listed column names output from SUB_FG_TASK_2 in creating the calculation formula? Think step by step about this, then answer either Yes|No.

SUB_FG_TASK_5_Q2—Did you use one or more of the listed operators and functions output from SUB_FG_TASK_3 in creating the calculation formula? Think step by step about this, then answer either Yes|No.

SUB_FG_TASK_5_Q3—Did you use an available operator or function outside the selected operators and functions output from SUB_FG_TASK_3 in creating the formula? Let's think step by step when answering, is there an implicit operation/function that should have been included?

SUB_FG_TASK_5_Q4—For the created calculation formula, was FORMULA_GENERATION_GUIDELINE_3 adhered to? Think step by step about this when answering.

SUB_FG_TASK_5_Q5—For the created calculation formula, is its syntax correct? Think step by step about this, then answer either Yes|No.

SUB_FG_TASK_5_Q6—For the created calculation formula, does it meet the needs of the business query? Think step by step about this, then answer either Yes|No.

Output Structure ####

```
<selected_metadata>
{{
  "column_names": [
    "column_name": <the column name>,
    "model_reference": <name of the column as it is
      referenced in the data model, and to be used within
      the generated formula>,
    "selection_reason": <reason column was selected>,
    "bi_query_section": <connect to natural language BI
      Data Analysis Query>
    ]
  }}
  </selected_metadata>
  <formula_op_func>
  {{
  "formula_op_func_list":[
  {{
    "form_op_name": <formula or operator name>,
    "syntax": <syntax for formula or operator>,
    "reason": <context for selection>,
    "n1_query_connection": <connection to the natu-
      ral language BI Data Analysis Query>
  }}
  ]
  }}
  </formula_op_func>
  <created_formula>
  {{
  "gen_formula": <the generated formula>
  }}
  </created_formula>
  <formula_self_review>
  {{
  "<SUB_FG_TASK_5_Q1 question>": <your gener-
    ated answer to question SUB_FG_TASK_5_Q1
    here>,
  "<SUB_FG_TASK_5_Q2 question>": <your gener-
    ated answer to question SUB_FG_TASK_5_Q2
    here>,
  "<SUB_FG_TASK_5_Q3 question>": <your gener-
    ated answer to question SUB_FG_TASK_5_Q3
    here>,
  "<SUB_FG_TASK_5_Q4 question>": <your gener-
    ated answer to question SUB_FG_TASK_5_Q4
    here>,
```

"<SUB_FG_TASK_5_Q5 question>": <your generated answer to question SUB_FG_TASK_5_Q5 here>, "<SUB_FG_TASK_5_Q6 question>": <your generated answer to question SUB_FG_TASK_5_Q6 here>

}}

</formula_self_review>

Metadata to Formula Mapping ####

The below syntax indicates how features represented within the natural language BI Data Analysis Query are to be referenced with the generated formula. For each identified feature within the natural language BI Data Analysis Query, use the feature name and related metadata DataType to determine the correct syntax to be used.

Syntax|Description|Example

[IDENTIFIER], An ACCOUNT MEMBER or MEASURE can be used in a formula by enclosing the ID inside brackets: [ ], [PROFIT]

[d/DIMENSION_IDENTIFIER], A DIMENSION can be used in a formula by enclosing the DIMENSION ID inside [d/], [d/PRODUCT]

[d/DIMENSION_IDENTIFIER].[p/ATTRIBUTE], A DIMENSION attribute can be used in a formula by adding a suffix to the DIMENSION_IDENTIFIER, starting with .[p/and ending with](Your formulas can use attributes to specify DIMENSION members, for example in an IF statement, and in a model with measures you can also use the values of numeric attributes in calculations.), [d/PRODUCT].[p/Description]

[d/DIMENSION_IDENTIFIER].[h/HIERARCHY_IDENTIFIER], Results can be calculated for only a particular hierarchy, by adding a suffix to the DIMENSION_IDENTIFIER, starting with .[h/ and ending with], [d/PRODUCT].[h/ALL_PRODUCTS]

In the Modeler: ['VARIABLE_IDENTIFIER'] In stories: [@VARIABLE_IDENTIFIER], A variable can be used in a formula by enclosing the variable identifier inside [' '](in the Modeler) or inside [@] (in stories), ['PRODUCT_VARIABLE'][@PRODUCT_VARIABLE]

[MODEL_IDENTIFIER], For LINK formulas only: the first parameter is the model identifier, which can be specified by enclosing the model ID inside [ ], [BusinessPlanning:BusinessPlanning]

Tabular Data Metadata ####

<meta_data>

{0}

</meta_data>

AVAILABLE OPERATOR AND FUNCTIONS ####

<operator_function>

{1}

</operator_function>

Handling percentage references within the natural language BI Data Analysis Query ####

Pay special attention if the natural language BI Data Analysis Query references percentages.

Handle and convert to percentage where relevant. For example, depending on context of the natural language BI Data Analysis Query, you would:

translate the percentage reference 10% to 0.1 translate the percentage reference 44 percent to 0.44 translate the percentage reference 4 percentage to 0.04

Important Rules ####

1. Complete all subtasks listed for FG_TASK. That is, make sure to complete SUB_FG_TASK_1, SUB_FG_TASK_2, SUB_FG_TASK_3, SUB_FG_TASK_4, SUB_FG_TASK_5.
2. For SUB_FG_TASK_4, follow the guidelines under FORMULA_GENERATION_GUIDELINES.
3. For SUB_FG_TASK_5, make sure to answer SUB_FG_TASK_5_Q1, SUB_FG_TASK_5_Q2, SUB_FG_TASK_5_Q3, SUB_FG_TASK_5_Q4, SUB_FG_TASK_5_Q5 and SUB_FG_TASK_5_Q6."

What is claimed is:

1. A system comprising:

a memory storing program code; and one or more processing units to execute the program code to cause the system to:

receive a natural language description of a calculation formula and column names of a data source;

generate a first prompt to prompt determination of calculation components of the calculation formula based on the natural language description and the column names of the data source;

transmit the first prompt to a text generation model;

receive a plurality of calculation components from the text generation model in response to the first prompt;

for each of the plurality of calculation components, determine descriptions of each of one or more similar operators by:

transmission of each of the plurality of calculation components to an embedding model to determine an embedding for each of the plurality of calculation components;

querying of a vector database for each determined embedding; and in response to the querying, reception of, for each of the plurality of calculation components, descriptions of each of one or more similar operators from the vector database;

generate a second prompt to determine the calculation formula based on the natural language description, the column names of the data source and the descriptions of each of the one or more similar operators of each of the plurality of calculation components;

transmit the second prompt to the text generation model;

receive the calculation formula from the text generation model in response to the second prompt; and present the calculation formula.

2. The system according to claim 1, the one or more processing units to execute the program code to cause the system to:

execute a syntactic validation on the received calculation formula.

3. The system according to claim 2, the one or more processing units to execute the program code to cause the system to:

execute a functional validation on the received calculation formula.

4. The system according to claim 1, the first prompt including a first system prompt and a first user prompt, wherein the first user prompt includes the natural language description and the column names of the data source.

5. The system according to claim 4, the second prompt including a second system prompt and a second user prompt, wherein the second system prompt includes the column names of the data source and the descriptions of each of the one or more similar operators, and the second user prompt includes the natural language description.

6. A method comprising:

receiving a natural language description of a calculation formula;

generating a first prompt to prompt determination of calculation components of the calculation formula based on the natural language description;

transmitting the first prompt to a text generation model;

receiving a plurality of calculation components from the text generation model in response to the first prompt;

for each of the plurality of calculation components, determining descriptions of each of one or more similar operators by:

transmitting each of the plurality of calculation components to an embedding model to determine an embedding for each of the plurality of calculation components;

querying a vector database for each determined embedding; and in response to the querying, receiving, for each of the plurality of calculation components, descriptions of each of one or more similar operators from the vector database;

generating a second prompt to determine the calculation formula based on the natural language description, column names of a data source against which the calculation formula is to be applied, and the descriptions of each of the one or more similar operators of each of the plurality of calculation components;

transmitting the second prompt to the text generation model;

receiving the calculation formula from the text generation model in response to the second prompt; and presenting the calculation formula.

7. The method according to claim 6, further comprising:

executing a syntactic validation on the received calculation formula.

8. The method according to claim 7, further comprising:

executing a functional validation on the received calculation formula.

9. The method according to claim 6, the first prompt including a first system prompt and a first user prompt, wherein the first user prompt includes the natural language description and the column names of the data source.

10. The method according to claim 9, the second prompt including a second system prompt and a second user prompt, wherein the second system prompt includes the column names of the data source and the descriptions of each of the one or more similar operators, and the second user prompt includes the natural language description.

11. A non-transitory medium storing program code executable by one or more processing units of a computing system to cause the computing system to:

receive a natural language description of a calculation formula and column names of a data source;

generate a first prompt to prompt determination of calculation components of the calculation formula based on the natural language description;

transmit the first prompt to a text generation model;

receive a plurality of calculation components from the text generation model in response to the first prompt;

for each of the plurality of calculation components, determine descriptions of each of one or more operators similar to a calculation component by:

transmission of each of the plurality of calculation components to an embedding model to determine an embedding for each of the plurality of calculation components;

querying of a vector database for each determined embedding; and in response to the querying, reception of, for each of the plurality of calculation components, descriptions of each of one or more similar operators from the vector database;

generate a second prompt to determine the calculation formula based on the natural language description, the column names of the data source and the descriptions of each of the one or more similar operators determined for each of the plurality of calculation components;

transmit the second prompt to the text generation model; and receive the calculation formula from the text generation model in response to the second prompt.

12. The medium according to claim 11, the program code executable by one or more processing units of a computing system to cause the computing system to:

execute a syntactic validation on the received calculation formula.

13. The medium according to claim 12, the program code executable by one or more processing units of a computing system to cause the computing system to:

execute a functional validation on the received calculation formula.

14. The medium according to claim 11, the first prompt including a first system prompt and a first user prompt, wherein the first user prompt includes the natural language description and the column names of the data source, and the second prompt including a second system prompt and a second user prompt, wherein the second system prompt includes the column names of the data source and the descriptions of each of the one or more similar operators, and the second user prompt includes the natural language description.

* * * * *